(12) United States Patent
Haswell et al.

(10) Patent No.: US 7,008,521 B2
(45) Date of Patent: Mar. 7, 2006

(54) DEVICE HAVING A LIQUID FLOWPATH

(75) Inventors: Stephen John Haswell, Cottingham (GB); Thomas McCreedy, Hessle (GB); Victoria Skelton, Hull (GB); Christine Jane Clive, Hull (GB); Paul David Ian Fletcher, Hull (GB)

(73) Assignee: Micro Chemical Systems Limited, Hull (GB)

( * ) Notice: Subject to any disclaimer, the term of this patent is extended or adjusted under 35 U.S.C. 154(b) by 494 days.

(21) Appl. No.: 10/246,770

(22) Filed: Sep. 19, 2002

(65) Prior Publication Data

US 2003/0052010 A1    Mar. 20, 2003

(30) Foreign Application Priority Data

Sep. 20, 2001    (GB)    .................................... 0122740

(51) Int. Cl.
*B01L 3/00*         (2006.01)
(52) U.S. Cl. ........................................ 204/600; 422/100
(58) Field of Classification Search ................ 204/600, 204/450; 422/100; 366/349, 341; 137/808, 137/827

See application file for complete search history.

(56) References Cited

U.S. PATENT DOCUMENTS 5,376,252 A * 12/1994 Ekstrom et al. ............. 204/603

| | | | |
|---|---|---|---|
| 6,344,120 B1 | 2/2002 | Haswell et al. | |
| 6,368,871 B1 * | 4/2002 | Christel et al. | ............. 436/180 |
| 6,695,765 B1 * | 2/2004 | Beebe et al. | ................... 600/33 |
| 2002/0053532 A1 | 5/2002 | Quake et al. | |
| 2002/0143437 A1 | 10/2002 | Handique et al. | |

FOREIGN PATENT DOCUMENTS

| | | |
|---|---|---|
| EP | 0 430 248 A2 | 6/1991 |
| EP | 1 063 204 A2 | 12/2000 |
| EP | 1 063 204 A3 | 8/2002 |
| WO | WO 02/094440 A2 | 11/2002 |

OTHER PUBLICATIONS

Raymond, et al.; "Continuous Sample Pretreatment Using a Free-Flow Electrophoresis Device Integrated onto a Silicon Chip"; Analytical Chemistry, vol. 66, No. 18, Sep. 15, 1994, pp. 2858-2865.

* cited by examiner

Primary Examiner—Kaj K. Olsen
(74) Attorney, Agent, or Firm—Leydig, Voit & Mayer, Ltd.

(57) ABSTRACT

A micro-reactor is provided with a mixture of channels having larger cross-sectional areas (17',22',25',27',31',33') and channels having smaller cross-sectional areas (40a', 40b',40c'). The smaller channels (40a',40b',40c') resist liquid movement driven by hydrostatic force but allow liquid movement driven by electro-osmotic force. Accordingly liquid flow is almost entirely driven by electro-osmotic force. The smaller channels (40a',40b',40c') are formed by etched grooves which are closed by a planar surface 13. This allows the cross-sectional areas of the smaller channels to be closely and reproducibly controlled.

7 Claims, 1 Drawing Sheet

DEVICE HAVING A LIQUID FLOWPATH

FIELD OF THE INVENTION

The invention relates to a device having a flowpath for electrokinetically driven liquid flow along the flowpath.

BACKGROUND

One such device of a known type is a chip-type micro-reactor. A chip-type micro-reactor has a plurality of interconnected channels connecting a plurality of reservoirs for holding liquids. Liquids from the reservoirs are moved into and through the channels where they mix in a controlled manner. Controlled mixing is often used to control chemical reactions, e.g. between solutes in the liquids. One way in which the liquids can be moved is by generating an electro-osmotic force in the channels, the electro-osmotic force driving the liquids through the channels. Electro-osmotic force is a well known type of electrokinetic force and is described in detail in "Development and operating characteristics of micro flow injection analysis systems based on electro-osmotic flow", by S. J. Haswell, Analyst, 1997, Vol. 122, 1R–10R (the contents of which are incorporated herein by reference). Another electrokinetic force is electrophoresis.

A problem, however, with such micro-reactors is that differences in liquid levels in the reservoirs lead to hydrostatic forces acting on the liquids, tending to move the liquids through the channels. It is often desirable to minimize liquid flow caused by hydrostatic fore.

According to the invention, there is provided a device having a flowpath therein for electrokinetically driven liquid flow therealong, the device comprising at least first and second members together having a first groove with a larger cross-sectional area and a second groove with a smaller cross-sectional area, the members together having at least one surface and being connected together so that the at least one surface closes the first and second grooves to form respective first and second channels in said flowpath with larger and smaller cross-sectional areas respectively, the cross-sectional area of the second channel being such that the second channel resists hydrostatically driven liquid flow along the flowpath.

BRIEF DESCRIPTION OF THE DRAWINGS

The following is a more detailed description of embodiments of the invention, by way of example, reference being made to the appended schematic drawings in which.

DETAILED DESCRIPTION

Figure 1:
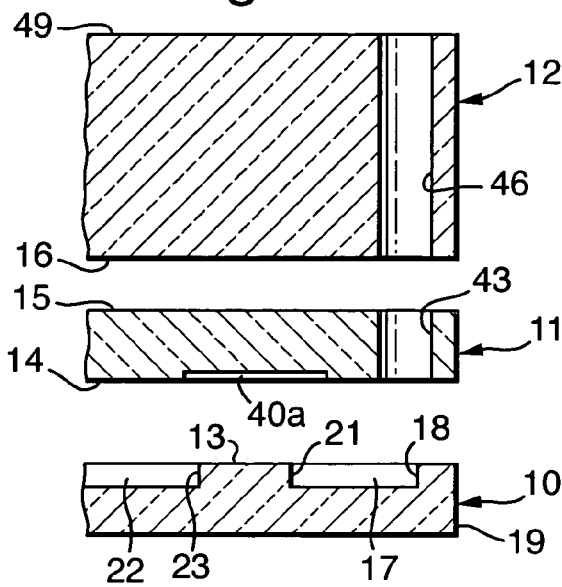
FIG. 1 is a cross-sectional representation, taken on dotted line I—I of FIG. 2, of parts of components of a chip-type micro-reactor during a stage in the production of the micro-reactor.

As seen in FIG. 1, the chip-type micro-reactor is formed from a lower glass block 10, a middle glass block 11 and an upper glass block 12. The lower glass block 10 has an upper planar surface 13. The middle glass block 11 has a lower planar surface 14 and an upper planar surface 15, and the upper glass block 12 has a lower planar surface 16.

It will be noted that in the finished micro-reactor, the upper planar surface 13 of the lower glass block 10 is connected to the lower planar surface 14 of the middle glass block and the upper planar surface 15 of the middle glass block 11 is connected to the lower planar surface 16 of the upper glass block 12. This will be described in more detail below. The planar surfaces 13–16 are shown spaced from one another in FIG. 1 as FIG. 1 shows a stage in the manufacture of the micro-reactor.

Figure 2:
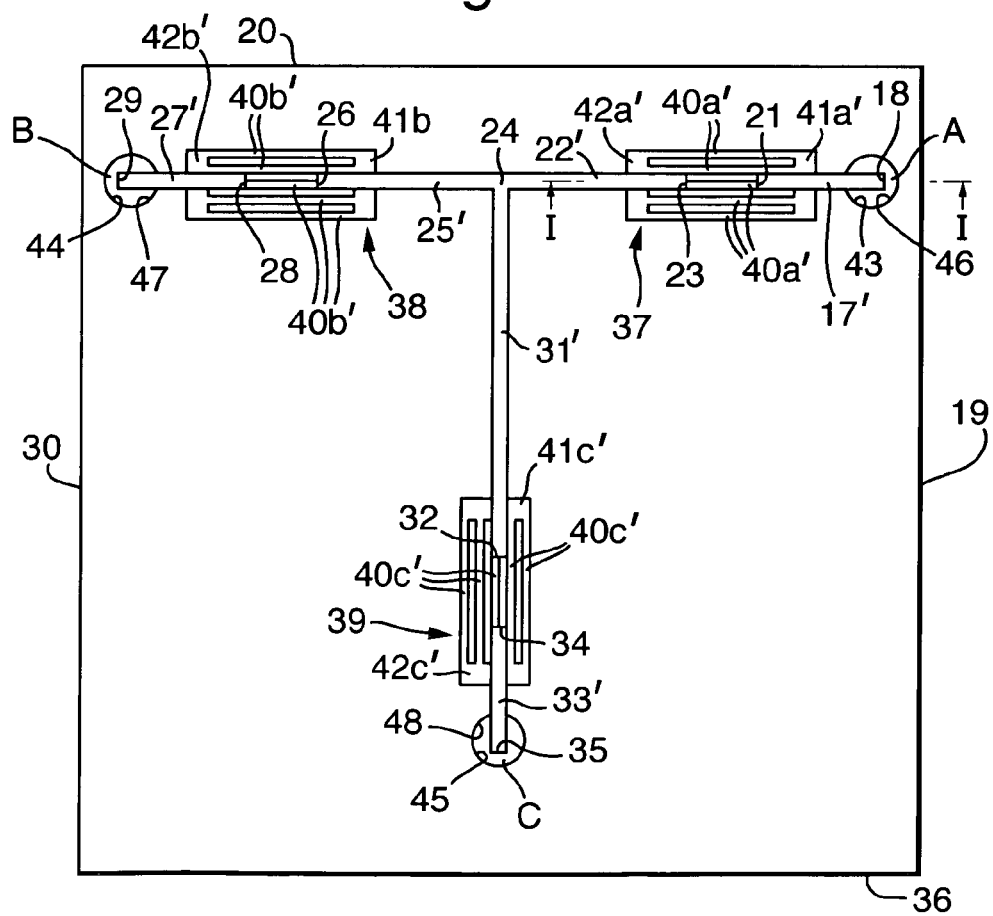
FIG. 2 shows in plan view the final configuration of channels and of reservoirs in the micro-reactor produced from the components shown in FIG. 1.

Referring now to FIGS. 1 and 2, six grooves are formed in the upper planar surface 13 of the lower glass block 10. The grooves may be formed in any known manner, for example by etching. Each groove may have, for example, a width in the region of 150 $\mu$m and a depth in the region of 25 $\mu$m. Generally speaking the grooves will be no wider or deeper than 500 $\mu$m. The six grooves have cross-sectional areas that are relatively large (see below) compared to other grooves described below and will be referred to as the "large" grooves in view of this.

The relative positions of the six large grooves are indicated in FIG. 2 (FIG. 2 shows channels that are formed from the grooves, as discussed below, and are identified with reference numerals provided with apostrophes, the grooves having corresponding reference numerals without the apostrophes). A first large groove 17 has a first end 18 near to a first side 19 of the lower glass block 10 and extends parallel with and near to a first end 20 of the lower glass block 10 to its second end 21. A second large groove 22 has its first end 23 spaced from but close to the second end 21 of the first large groove 17, and extends in line with the first large groove 17 to a T-junction 24. A third large groove 25 extends in line with the first and second large grooves 17,22 from the T-junction 24 to its first end 26. A fourth large groove 27 has its first end 28 spaced from but near to the first end 26 of the third large groove 25. The fourth large groove 27 extends in line with the first, second and third large grooves 17,22,25 to its second end 29, which is located adjacent a second side 30 of a lower glass block 10.

A fifth large groove 31 extends in a direction perpendicular to the first, second, third and fourth large grooves 17,22,25,27 from the T-junction 24 to its first end 32. A sixth large groove 33 has a first end 34 spaced from but close to the first end 32 of the fifth large groove 31 and extends in line with the fifth large groove 31 to its second end 35 which lies close to a second end 36 of the lower glass block 10.

The second large groove 22, the third large groove 25 and the fifth large groove 31 connect with one another at the T-junction 24.

First, second and third rectangular grids 37,38,39 are etched into the lower planar surface 14 of the middle glass block 11. The grids 37, 38, 39 are best seen in FIG. 2. The three rectangular grids 37,38,39 are identical to one another and so only the first grid 37 will be described in detail. Corresponding reference numerals will be used for corresponding parts of the three grids 37,38,39, with the numerals of the parts of the first grid 37 having the suffix "a", the numerals of the parts of the second grid 38 having the suffix "b", and the numerals of the parts of the third grid 39 having the suffix "c".

The first rectangular grid 37 comprises five mutually parallel grooves 40a (all of which are represented in FIG. 2 and one of which is shown in FIG. 1). Each one of these grooves 40a has, for example, a width of about 200 $\mu$m and a depth of about 4 $\mu$m. The grooves 40a have smaller cross-sectional areas (see below) than the large grooves 17,22,25,27,31,33, and for this reason will be referred to below as the small grooves 40a. At one end of the first rectangular grid 37, ends of the small grooves 40a are connected by a first connecting groove 41a. At a second end of the first rectangular grid 37, the other ends of the small grooves 40a are connected by a second connecting groove 42a. The connecting grooves 41a,42a extend parallel to one another and normal to the lengths of the small grooves 40a.

The middle glass block 11 is also provided with first, second and third cylindrical apertures 43,44,45 that extend between the upper and lower planar surfaces 14,15.

The upper glass block 12 also has first, second and third cylindrical apertures 46,47 and 48 that extend between the lower planar surface 16 and an upper planar surface 49 of the upper glass block 12.

As indicated above, the lower planar surface 14 of the middle glass block 11 is bonded to the upper planar surface 13 of the lower glass block 10 and the lower planar surface 16 of the upper glass block 12 is bonded to the upper planar surface 15 of the middle glass block 11. Bonding of the surfaces may be achieved by thermal bonding or any other suitable process.

As will be appreciated, except where the grooves 40a, 40b,40c,41a,41b,41c,42a,42b, 42c provided in the lower planar surface 14 of the middle glass block overlie the large grooves 17,22,25,27,31,33 provided in the upper planar surface 13 of the lower glass block 10 (as described below in detail), the lower planar surface 14 of the middle glass block closes the large grooves 17,22,25,27,31,33 of the lower glass block 10 to form channels and the upper planar surface 13 of the lower glass block 10 closes the grooves 40a,40b,40c,41a,41b,41c,42a,42b,42c of the middle glass block 11 to form channels.

For the purposes of this description, the channels will be identified by the same reference numerals as the grooves from which they are formed with the reference numeral of the channel having an apostrophe added thereto. Hence, the first, second, third, fourth, fifth and sixth large grooves 17,22,25,27,31,33 become, respectively, the first, second, third, fourth, fifth and sixth channels 17',22',25',27',31',33'. Each connecting groove 41a,42a, 41b,42b, 41c,42c is closed to form, respectively, a connecting channel 41a',42a', 41b', 42b', 41c',42c'. Each small groove 40a,40b is closed to become, respectively, a small channel 40a',40b',40c'.

Each large channel 17',22',25',27',31' and 33' may have a cross-sectional area from about 3,000 $\mu m^2$ to about 10,000 $\mu m^2$, for example about 3,000–4,000 $\mu m^2$. Each small channel 40a',40b',40c' may have a cross-sectional area from about 500 $\mu m^2$ to about 1,000 $\mu m^2$, for example 500 $\mu m^2$. As the upper surface 13 of the lower glass block 10 and the lower surface 14 of the middle glass block 11 are planar, these cross-sectional areas are generally the same as those of the grooves from which the channels were formed.

The first rectangular grid 37 lies generally over the gap between the second end 21 of the first large channel 17' and the first end 23 of the second large channel 22'. Specifically, the first connecting channel 41a' lies over the first large channel 17' adjacent its second end 21 and the second connecting channel 42a' lies over the second large channel 22' adjacent its first end 23. Hence, the first connecting channel 41a' is in fluid communication with the first large channel 17' and the second connecting channel 42a' is in fluid communication with the second large channel 22'. The five small channels 40a' extend generally over the gap between the first and second large channels 17',22'. Hence, the first large channel 17' is connected to the second large channel 22' by the connecting channels 41a',42a' and the small channels 40a' formed by the first rectangular grid 37.

In a similar manner, the second rectangular grid 38 connects the third large channel 25' and the fourth large channel 27', the first connecting channel 41b' of the second grid 38 lying over the third large channel 25' and the second connecting channel 42b' of the second rectangular grid 38 lying over the fourth large channel 27'.

Similarly, the third rectangular grid 39 connects the fifth large channel 31' and the sixth large channel 33' with the first connecting channel 41c' of the third grid 39 lying over the fifth large channel 31' and the second connecting channel 42c' of the third grid 39 lying over the sixth large channel 33'.

The first aperture 43 of the middle glass block 11 lies over and connects with the first end 18 of the first large channel 17'. The second aperture 44 of the middle glass block 11 lies over and connects with the second end 29 of the fourth large channel 27'. Finally, the third aperture 45 of the middle glass block 11 lies over and connects with the second end 35 of the sixth large channel 33'. The first aperture 46 of the upper glass block 12 lies over the first aperture 43 of the middle glass block 11, the second aperture 47 of the upper glass block 12 lies over the second aperture 44 of the middle glass block 11 and the third aperture 48 of the upper glass block 12 lies over the third aperture 45 of the middle glass block 11. Each corresponding pair of apertures in the middle and upper glass blocks 11,12 form a continuous reservoir for holding liquid. The reservoir formed by the first apertures 43,46 is referred to as reservoir A. The reservoir formed by the second apertures 44,47 is referred to as reservoir B, and the reservoir formed by the third apertures 45,48 is referred to as reservoir C.

In use, the micro-reactor may be used to perform a chemical reaction.

For example, the channels of the micro-reactor are first filled with a suitable solvent for the reaction. This can be achieved by, for example, adding the solvent to reservoir A and by applying a high positive pressure to the reservoir A causing the solvent to move into and fill the channels. Once the channels have been filled, the remaining solvent is removed from the reservoir A. A first reagent, dissolved in the solvent, is then added to the reservoir A. A second reagent, also dissolved in the solvent, is added to the reservoir B. Solvent alone is added to the reservoir C.

Electrodes are then placed in the three reservoirs A,B,C and positive voltages are applied to the reservoirs A and B, relative to the reservoir C. The application of the voltages causes the solutions of the first and second reagent to move through the channels, as described below, in response to electro-osmotic forces generated in the channels by the voltages. Application of voltages to generate electro-osmotic forces is described in more detail in U.S. Pat. No. 6,344,120, which is incorporated herein by reference.

The first reagent solution moves from reservoir A into the first large channel 17', then into the first connecting channel 41a', then into each of the five small channels 40a'. From the five small channels 40a', the first reagent solution moves into the connecting channel 42a' and into the second large channel 22' to the T-junction 24. In a similar manner, the second reagent solution moves from the reservoir B into the fourth large channel 27', into the second connecting channel 42b', and then into each of the five small channels 40b'. From the small channels 40b', the second reagent solution moves into the first connecting channel 41b' and then into the third large channel 25'. The first and second reagent solutions mix at the T-junction 24 and proceed down the fifth large channel 31'. The mixture passes through the first connecting channel 41c', through the five small channels 40c' and into the second connecting channel 42c', and finally passes through the sixth large channel 33' to the reservoir C. The reagents react together during their passage from the T-junction 24 to the reservoir C and the product collects in the reservoir C.

As will be appreciated, differences in the heights of liquids in the reservoirs A, B and C lead to hydrostatic forces urging the solutions to move through the channels. The hydrostatic forces may urge the solutions in directions different to the desired directions (i.e. the directions dictated by the electro-osmotic forces). Also the hydrostatic forces will change as the levels of liquids in the reservoirs change.

Importantly, liquid movement driven by hydrostatic pressure is resisted by the small channels 40a',40b',40c'. The relatively small cross-sectional areas of these channels has the effect of resisting hydrostatically driven liquid flow by increasing the viscous resistance. On the other hand, liquid flow due to electro-osmotic force is unaffected by the small cross-sectional areas of the small channels 40a',40b',40c'. Hence, the provision of the small channels 40a',40b',40c' has the effect that liquid flow in the micro-reactor is dependent almost entirely on electro-osmotic force.

This is advantageous for the following reasons. Firstly, the fact that liquid flow is dependent almost entirely on electro-osmotic force makes it easier to control rates of liquid flow over time. For example, even though, over time, the level of liquid in the reservoir C increases relative to the levels in the reservoirs A and B, the hydrostatic force caused by the increasing head of liquid in the reservoir C does not significantly slow liquid flow towards the reservoir C. Additionally, for liquid flow caused by electro-osmotic force in a channel, the liquid moves at virtually the same velocity throughout the cross-sectional area of the channel. On the other hand, for liquid flow driven by hydrostatic force, liquid tends to move more rapidly in the centre of the channel compared to at the edges of the channel. The uniform liquid flow obtainable when liquid is driven substantially entirely by electro-osmotic force is desirable as this makes it easier to predict and control the manner in which different liquids mix, for example, at the T-junction 24.

The fact that the narrow channels are formed from grooves is advantageous as the dimensions of the channels can be controlled by controlling the dimensions of the grooves.

An example of a specific reaction that may be performed using this apparatus is the reaction of phenylboronic acid with 4-bromobenzonitrile to produce cyanobiphenyl, as described in U.S. Pat. No. 6,344,120. The palladium catalyst required for this reaction may be immobilised in the fifth large channel 31' in any suitable manner. Each reagent is placed in a respective one of the reservoirs A and B, as described above, and the solvent tetrahydrofuran/water is placed in reservoir C. On application of electrical voltages, as described in U.S. Pat. No. 6,344,120, the reagents move along the channels, as described above, meeting and reacting in the fifth large channel 31'. The cyanobiphenyl collects in reservoir C.

It will be appreciated that the micro-reactor may be varied in many ways. Firstly, the micro-reactor may have any desired configuration of channels and reservoirs, depending on the proposed use.

Secondly, the gaps between the channels in the lower glass block 10 could be bridged by a single small channel, or by a plural number of small channels other than five.

In the micro-reactor described above, the use of the connecting channels 41',42' means that the alignment between the lower and middle glass blocks 11 is not so critical. As the connecting channels 41'42' extend generally normal to the large channels with which they interconnect, slight deviations in alignment do not affect connection of the connecting channels 41',42' with the large channels.

While in the micro-reactor described above, the small grooves 40 are provided in a different glass block to the large grooves 17,22,25,27,31,33, this need not be the case. A mixture of small and large grooves could be etched in the same glass block and closed by a single planar surface of another glass block.

In many cases, it may be desirable to bridge two large channels by a plurality of small channels arranged such that liquid flow passes in parallel through the small channels. In this case, the narrow channels may or may not be geometrically parallel to one another.

Whereas in the example described above electro-osmotic force is used to move reagents through channels, electrophoresis could also be used.

The network of channels could be formed by more than two blocks. For example, large grooves could be formed in a first block and small grooves in a second block.

The first and second blocks could be connected to each other and to a third block that provides a surface to close the large and small grooves.

We claim:

1. A device having a flowpath therein for electrokinetically driven liquid flow therealong, the device comprising
   first and second members,
   first and second grooves in the first member,
   a plurality of third grooves in the second member, with each third groove having respective first and second ends,
   a first connecting groove in the second member, the first ends of the third grooves opening into the first connecting groove,
   a second connecting groove in the second member, the second ends of the third grooves opening into the second connecting groove, wherein
      the first member has a first member surface and the second member has a second member surface,
      the first and second member surfaces are connected to one another,
      the first member surface closes the third grooves to form a plurality of third channels,
      the first member surface closes the first and second connecting grooves to form first and second connecting channels,
      the second member surface closes the first and second grooves to form first and second channels,
      liquid flows along the flowpath, passing sequentially through the first channel, from the first channel into the first connecting channel, from the first connecting channel into the plurality of third channels, in parallel through the third channels, from the third channels into the second connecting channel, and from the second connecting channel into the second channel, and
      each third channel has a respective cross-sectional area smaller than cross-sectional areas of the first and second channels so that the third channels collectively resist hydrostatically driven liquid flow along the flowpath.

2. The device according to claim 1, wherein the plurality of third grooves are geometrically parallel to one another.

3. The device according to claim 1, wherein the flowpath has first and second ends, the cross-sectional dimensions of the flowpath being such that liquid can be moved along the flowpath by electro-osmotic force by applying a voltage between the first and second ends of the flowpath.

4. The device according to claim 1, including a first aperture in one of the first and second members for holding a liquid to be moved along the flowpath, the aperture being in fluid communication with the flowpath.

5. The device according to claim 4, including a third member connected to said one of the first and second members by the first aperture, the third member having a second aperture that connects with the first aperture in said one of the first and second members.

6. The device according to claim 1, wherein each third channel has a cross-sectional area of between 500 $\mu m^2$ and 1,000 $\mu m^2$.

7. The device according to claim 1, wherein each of the first and second channels has a cross-sectional area of between 3,000 $\mu m^2$ and 10,000 $\mu m^2$.

* * * * *